(12) United States Patent
Li et al.

(10) Patent No.: US 11,822,062 B2
(45) Date of Patent: Nov. 21, 2023

(54) ULTRA-SHORT FOCUS PROJECTING OPTICAL SYSTEM AND PROJECTION DEVICE

(71) Applicant: Union Optech Co., Ltd., Zhongshan (CN)

(72) Inventors: Yuancai Li, Zhongshan (CN); Liwei Quan, Zhongshan (CN); Shoulin Li, Zhongshan (CN); Hao Wang, Zhongshan (CN)

(73) Assignee: Union Optech Co., Ltd., Zhongshan (CN)

( * ) Notice: Subject to any disclaimer, the term of this patent is extended or adjusted under 35 U.S.C. 154(b) by 188 days.

(21) Appl. No.: 17/505,873

(22) Filed: Oct. 20, 2021

(65) Prior Publication Data
US 2023/0043860 A1 Feb. 9, 2023

(30) Foreign Application Priority Data
Aug. 2, 2021 (CN) .......................... 202110883634.6

(51) Int. Cl.
| | |
|---|---|
| *G02B 13/24* | (2006.01) |
| *G02B 13/00* | (2006.01) |
| *G03B 21/53* | (2006.01) |
| *H04N 9/31* | (2006.01) |

(52) U.S. Cl.
CPC ......... *G02B 13/24* (2013.01); *G02B 13/0045* (2013.01); *G03B 21/53* (2013.01); *H04N 9/31* (2013.01)

(58) Field of Classification Search
CPC .............. G02B 13/0035; G02B 13/005; G02B 13/0045; G02B 13/0065; G02B 13/009; G02B 15/14; G02B 15/143; G02B 15/1461; G02B 15/143103; H04N 9/31; H04N 9/315; H04N 9/3108; H04N 9/3141; H04N 9/3152; H04N 9/3185
See application file for complete search history.

(56) References Cited

U.S. PATENT DOCUMENTS

| | | | | |
|---|---|---|---|---|
| 7,215,479 | B1 * | 5/2007 | Bakin ................. | G02B 3/0056 |
| | | | | 359/784 |
| 2017/0371132 | A1 * | 12/2017 | Saito ........................ | G02B 9/60 |
| 2018/0284403 | A1 * | 10/2018 | Gong ................. | G02B 13/0045 |
| 2019/0121093 | A1 * | 4/2019 | Gong ................. | G03B 21/147 |
| 2020/0026044 | A1 * | 1/2020 | Xie ........................ | G02B 13/006 |
| 2021/0181487 | A1 * | 6/2021 | Yasui ..................... | G03B 21/28 |

* cited by examiner

*Primary Examiner* — Sultan Chowdhury
(74) *Attorney, Agent, or Firm* — Westbridge IP LLC

(57) ABSTRACT

Disclosed is an ultra-short focus projecting optical system, which includes a display unit, a first lens group having a positive focus power, a second lens group having a positive focus power, a third lens group having a negative focus power, and an aspherical reflector arranged sequentially along a projection direction. The first lens group includes a first lens, a second lens and a diaphragm arranged sequentially along the projection direction. The first lens is a glass aspherical lens, the second lens is a glass spherical lens, and the first lens and the second lens are bent toward the diaphragm from their respective centers to their respective peripheries. The ultra-short focus projecting optical system and a projection device provided by this application can realize a large aperture and high resolution.

16 Claims, 3 Drawing Sheets

ULTRA-SHORT FOCUS PROJECTING OPTICAL SYSTEM AND PROJECTION DEVICE

CROSS-REFERENCE TO RELATED APPLICATIONS

The present application claims the benefit of Chinese Patent Application No. 202110883634.6 filed on Aug. 2, 2021. The disclosure of the aforementioned application is hereby incorporated by reference in its entirety.

TECHNICAL FIELD

The present application relates to the technical field of projection devices, in particular to an ultra-short focus projecting optical system and a projection device.

BACKGROUND

With the development of projection technology in recent years, projectors are widely used in home, education, office and other places. Generally, the ultra-short focus projector is favored for it can project large pictures in a short distance and better adapt to compact spaces. The ultra-short focus projecting optical system is the core component of the ultra-short focus projector and the price thereof is on the high side. The existing ultra-short focus projecting optical system generally has an aperture value above 2.5 and a small aperture in order to reduce the cost.

The foregoing content is only used to assist in understanding the technical solution of the present application, and it does not mean that the foregoing content is recognized as prior art.

SUMMARY

The main objective of the present application is to provide an ultra-short focus projecting optical system and a projection device, aiming at solving the technical problems that the existing ultra-short focus projecting optical system generally has a small aperture.

To achieve the above objective, the present application provides an ultra-short focus projecting optical system. The ultra-short focus projecting optical system includes a display unit, a first lens group having a positive optical power, a second lens group having a positive optical power, a third lens group having a negative optical power, and an aspherical reflector arranged in order along a projection direction;

the first lens group includes a first lens, a second lens and a diaphragm arranged in order along the projection direction, the first lens is a glass aspherical lens, the second lens is a glass spherical lens, and the first lens and the second lens are bent toward the diaphragm from their respective centers to their respective peripheries.

In one embodiment, both the second lens group and the third lens group are movable to be close to or away from the display unit in the projection direction.

In one embodiment, the ultra-short focus projecting optical system further includes a linkage member connecting the second lens group and the third lens group.

In one embodiment, the second lens group includes a third lens which is a plastic aspherical lens.

In one embodiment, a focus power of the first lens group is $\varphi_1$, and $0.04 \leq \varphi_1 \leq 0.06$;

a focus power of the second lens group is $\varphi_2$, and $0 \leq \varphi_2 \leq 0.01$;

a focus power of the third lens group is $\varphi_3$, and $-0.04 \leq \varphi_3 \leq 0$; and a focus power of the aspherical reflector is $\varphi_4$, and $0.06 \leq \varphi_4 \leq 0.09$.

In one embodiment, the third lens group includes a fourth lens and a fifth lens arranged sequentially along the projection direction, the fourth lens and the fifth lens are plastic aspherical lenses.

In one embodiment, a focus power of the fourth lens is greater than or equal to −0.05 and less than or equal to 0; and a focus power of the fifth lens is greater than or equal to 0 and less than or equal to 0.04.

In one embodiment, an optical axis is formed in the ultra-short focus projecting optical system;

the display unit includes a digital micro-mirror device, an offset between a center of the digital micro-mirror device and the optical axis is C, and 2.6 mm ≤ C ≤ 3 mm.

In one embodiment, the first lens group further includes a cemented lens located on a side of the first lens away from the second lens, and the cemented lens includes a sixth lens and a seventh lens cemented together In addition, the present application also provides a projection device including the optical system as described above. The ultra-short focus projecting optical system includes a display unit, a first lens group having a positive optical power, a second lens group having a positive optical power, a third lens group having a negative optical power, and an aspherical reflector arranged in order along a projection direction;

the first lens group includes a first lens, a second lens and a diaphragm arranged in order along the projection direction, the first lens is a glass aspherical lens, the second lens is a glass spherical lens, and the first lens and the second lens are bent toward the diaphragm from their respective centers to their respective peripheries.

In the technical solution of this application, the projected light is transmitted sequentially through the first lens group having a positive power, the second lens group having a positive power and the third lens group having a negative power. Meanwhile, the first lens which is a glass aspherical lens is used together with the second lens which is a glass spherical lens, the first lens and the second lens are both bent toward the diaphragm from their respective centers to their respective peripheries, thereby effectively correcting spherical aberration and coma aberration generated by the diaphragm, raising the height of the emitted light rays, and realizing high resolution as well as a large aperture.

BRIEF DESCRIPTION OF THE DRAWINGS

In order to more clearly explain the embodiments of the present application or the technical solutions in related art, the drawings required for the description of the embodiments or the related art will be briefly described below. It will be apparent that the drawings described below are only some embodiments of the present application, and other drawings may be obtained from the structure shown in those drawings without any creative effort by those of ordinary skill in the art.

Figure 1:
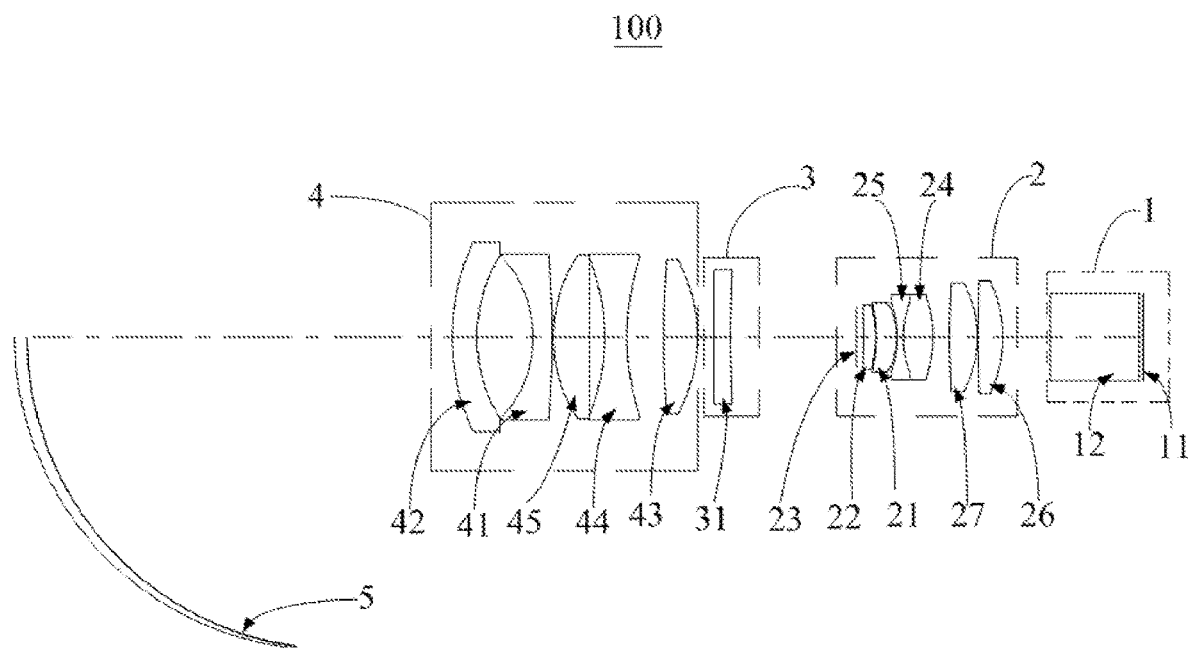
FIG. 1 is a schematic diagram of an embodiment of an ultra-short focus projecting optical system provided by the present application.

The realization of the objective, functional features and advantages of the present application will be further explained with reference to the accompanying drawings and in connection with the embodiments.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

It should be noted that if there are directional indications (such as up, down, left, right, front, back, and etc.) in the embodiment of the present application, the directional indications are only used to explain the relative positional relationship, movement, etc. between the components in a specific posture (as shown in the drawings). If the specific posture changes, the directional indication changes accordingly.

In addition, if there are descriptions relating to "first", "second", etc. in embodiments of the present application, the descriptions of "first", "second", etc. are for descriptive purposes only and cannot be understood as indicating or implying relative importance or impliedly indicating the number of the indicated technical features. Thus, a feature defined as "first", or "second" may explicitly or implicitly include at least one of the features. In addition, the meaning of "and/or" in the whole text includes three parallel solutions, taking "A and/or B" as an example, "A and/or B" includes only solution A, only solution B, or both solution A and solution B. Further, the technical solutions of the various embodiments can be combined with each other, but must be made based on the realization of those ordinary skilled in the art. When the combination of technical solutions is contradictory or cannot be achieved, it should be considered that such a combination of technical solutions does not exist, nor does it fall within the protection scope of the present application.

With the development of projection technology in recent years, projectors are widely used in home, education, office and other places. Generally, the ultra-short focus projector is favored for it can project large pictures in a short distance and better adapt to compact spaces. The ultra-short focus projecting optical system is the core component of the ultra-short focus projector and the price thereof is on the high side. The existing ultra-short focus projecting optical system generally has an aperture value above 2.5 and a small aperture in order to reduce the cost.

Figure 2:
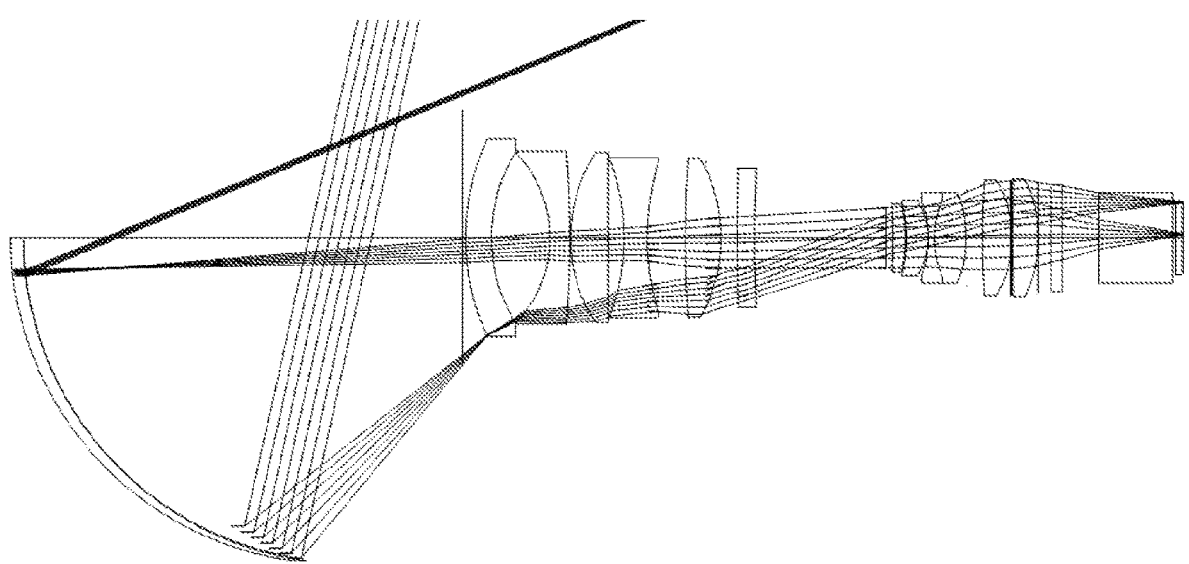
FIG. 2 is a schematic diagram of a projecting optical path of the ultra-short focus projecting optical system of FIG. 1.
Figure 3:
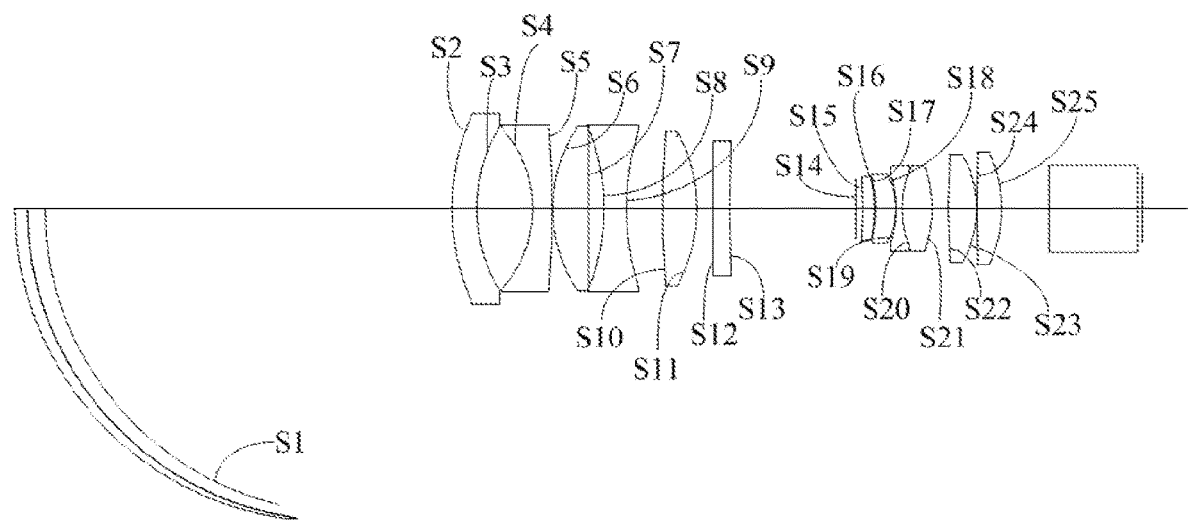
FIG. 3 is a schematic diagram showing surfaces of each lens of the ultra-short focus projecting optical system of FIG. 1.

In view of this, the present application provides an ultra-short focus projecting optical system. FIGS. 1 to 3 show an embodiment of the ultra-short focus projecting optical system provided by the present application.

Referring to FIGS. 1 to 2, the ultra-short focus projecting optical system 100 includes a display unit 1, a first lens group 2 having a positive focus power, a second lens group 3 having a positive focus power, a third lens group 4 having a negative focus power, and an aspherical reflector 5 arranged in order along a projection direction. The first lens group 2 includes a first lens 21, a second lens 22 and a diaphragm 23 arranged in order along the projection direction. The first lens 21 is a glass aspherical lens, the second lens 22 is a glass spherical lens, and the first lens 21 and the second lens 22 are both bent toward the diaphragm 23 from their respective centers to their respective peripheries.

In the technical solution of this application, the projected light is transmitted sequentially through the first lens group 2 having a positive power, the second lens group 3 having a positive power and the third lens group 4 having a negative power. Meanwhile, the first lens 21 which is a glass aspherical lens is used together with the second lens 22 which is a glass spherical lens, the first lens 21 and the second lens 22 are both bent toward the diaphragm 23 from their respective centers to their respective peripheries, thereby effectively correcting spherical aberration and coma aberration generated by the diaphragm 23, raising the height of the emitted light rays, and realizing high resolution as well as a large aperture.

It should be emphasized that the present application does not specifically define the degrees of bending of the first lens 21 and the second lens 22 as long as the spherical aberration and coma aberration generated by the diaphragm 23 can be effectively corrected. Specifically, referring to FIG. 1, in this embodiment, a degree of bending of a light exit surface of the first lens 21 close to the aspherical reflector 5 is greater than a degree of bending of a light entry surface of the first lens 21 close to the display unit 1, and a degree of bending of a light entry surface of the second lens 22 is greater than a degree of bending of a light exit surface of the second lens 22.

Understandably, the focus power is equal to the difference between the convergence of the light beams of the image side and the convergence of the light beams of the object side, which represents the ability of an optical element to deflect light rays. When the focus power is positive, the light is deflected to be convergent. When the power is negative, the light is deflected to be divergent. The focus power can be used to characterize a refractive surface of a lens (i.e., a surface of the lens), a lens or a system formed by multiple lenses (i.e., a lens group).

Further, both the second lens group 3 and the third lens group 4 can be movably arranged to move near or away from the display unit 1 along the projection direction, and the focusing of the ultra-short focus projecting optical system 100 is realized by the movement of the second lens group 3 and the third lens group 4, which is helpful to improve the optical performance of the ultra-short focus projecting optical system 100.

It should be noted that the present application does not limit the specific moving modes of the second lens group 3 and the third lens group 4. The second lens group 3 and the third lens group 4 can be moved independently from each other, or the second lens group 3 and the third lens group 4 can be linked and moved together. In particular, refer to FIG. 1, in this embodiment, the ultra focus projecting optical system 100 also includes a linkage member (not shown). The linkage member is connected with both the second lens group 3 and the third lens group 4, and the linkage member drives the second lens group 3 and the third lens group 4 to adjust positions according to a certain proportional relationship, thereby realizing linkage focusing, and realizing distortion correction and image correction of different pictures between 70 inches and 120 inches through linkage focusing.

The present application does not limit the specific embodiment of the linkage member, and the linkage member may be of a lead screw structure, a gear structure, or another structure for realizing the linkage of the second lens group 3 and the third lens group 4, which will not be described here.

In addition, the second lens group 3 includes a third lens 31 which is a plastic aspherical lens. For the third lens 31 is a plastic aspherical lens, and the second lens group 3 is linked with the third lens group 4, the effect of distortion correction and image correction of different pictures from 70 inches to 120 inches is further improved.

Further, the focus power of the first lens group 2 is set to be $\varphi_1$, and $0.04 \leq \varphi_1 \leq 0.06$. The focus power of the second lens group 3 is set to be $\varphi_2$, and $0 \leq \varphi_2 \leq 0.01$. The focus power of the third lens group 4 is set to be $\varphi_3$, and $-0.04 \leq \varphi_3 \leq 0$. The focus power of the aspherical reflector 5 is set as $\varphi_4$, and $0.06 \leq \varphi_4 \leq 0.09$. When the lens groups are assigned with the above-mentioned focus powers, the projection ratio is less than 0.2, and the defocusing does not exist at high temperature. At the same time, the sensitivity of each lens group is greatly reduced, which is helpful for mass production.

The third lens group 4 includes a fourth lens 41 and a fifth lens 42 arranged in order along the projection direction. The fourth lens 41 and the fifth lens 42 are plastic aspherical lenses, so that the light incident angles can be effectively corrected, and the sizes and costs of the lenses can be reduced.

Further, a focus power of the fourth lens 41 is greater than or equal to −0.05 and less than or equal to 0, and a focus power of the fifth lens 42 is greater than or equal to 0 and less than or equal to 0.04. By assigning the focus powers of the fourth lens 41 and the fifth lens 42 in this way, the lenses can be automatically balanced at high temperature, and defocusing does not exist at high temperature.

It should be noted that, the third lens group 4 further includes an eighth lens 43, a ninth lens 44 and a tenth lens 45 arranged in order in the projection direction, The eighth lens 43, the ninth lens 44 and the tenth lens 45 are all located between the fourth lens 41 and the second lens group 3, and the eighth lens 43, the ninth lens 44, and the tenth lens 45 are all glass spherical lenses. Focus powers of the eighth lens 43 and the tenth lens 45 are both greater than or equal to 0 and less than or equal to 0.04, and a focus power of the ninth lens 44 is greater than or equal to −0.05 and less than or equal to 0.

An optical axis is formed in the ultra-short focus projecting optical system 100. The display unit 1 includes a digital micro-mirror device, and the offset between the center of the digital micromirror device and the optical axis is C, and 2.6 mm $\leq C \leq$ 3 mm. In this way, it is beneficial to improve the imaging clarity. Specifically, referring to FIG. 1, in this embodiment, the digital micro-mirror device is a Digital Micro-minor Device (DMD) chip, the center of the DMD chip 11 is deviated from the optical axis by 2.8 mm, the DMD chip 11 is 0.33 inches, the resolution of the DMD chip 11 is 1368×768, and 1080P can be realized by a scanning galvanometer.

The display unit 1 also includes an equivalent prism 12, which is disposed between the DMD chip 11 and the first lens group 2 to reduce the aberration caused by refractive transmission of light rays.

The first lens group 2 further includes a cemented lens located on a side of the first lens 21 away from the second lens 22, the cemented lens includes a sixth lens 24 and a seventh lens 25 cemented together, thus contributing to the elimination of chromatic aberration. It is understandable that the chromatic aberration is formed after the light passing through a lens, which makes the imaging blurred. Therefore, chromatic aberration has become a serious defect in lens imaging. A cemented lens is formed by cementing a plurality of lenses. When light passes through one of the lenses of the cemented lens and is refracted, chromatic aberration is generated, and when the refracted light continues to pass through another lens, the generated chromatic aberration is just reversed and can counteract the previous chromatic aberration, thereby achieving the purpose of eliminating chromatic aberration.

Specifically, the bonding between the sixth lens 24 and the seventh lens 25 is achieved by an optical glue, which has a high light transmittance and helps to improve the imaging effect of the projected light.

It should be noted that, the first lens group 2 further includes an eleventh lens 26 and a twelfth lens 27 arranged in order along the projection direction. The eleventh lens 26 and the twelfth lens 27 are both located between the sixth lens 24 and the display unit 1, and the eleventh lens 26 and the twelfth lens 27 are both glass spherical lenses. Focus powers of the eleventh lens 26 and the twelfth lens 27 are both greater than or equal to 0 and less than or equal to 0.04.

It should be noted that shapes of the aspherical surfaces of the first lens 21, the third lens 31, the fourth lens 41, the fifth lens 42, and the aspherical reflector 5 satisfy the following equation:

$$Z = cy^2 / \{1 + \sqrt{1-(1+k)c^2y^2}\} \pm a_1 y^2 + a_2 y^4 + a_3 y^6 + a_4 y^8 + a_5 y^{10} + a_6 y^{12} + a_7 y^{14} + a_8 y^{16}.$$

In the above equation, c is a curvature corresponding to the radius; y is a radial coordinate (the unit of the radial coordinate is the same as the unit of the lens length); k is a conic coefficient, when k is less than −1, the curve of the surface shape of the lens is hyperbola, when k is equal to −1, the curve of the surface shape of the lens is parabola, when k is between −1 and 0, the curve of the surface shape of the lens is ellipse, when k is equal to 0, the curve of the surface shape of the lens is circular, and when k is greater than 0, the curve of the surface shape of the lens is oblate; a1 to a8 represent coefficients corresponding to radial coordinates.

The following case shows actual design parameters of a ultra-short focus projecting optical system 100 with F1.8 and projection ratio of 0.2. Table 1 is referred to for details.

TABLE 1

Parameters of the Ultra-short Focus Projecting optical system 100

| Surface number | Type | Radius R | Thickness | Optical material | Calibre |
|---|---|---|---|---|---|
| OBJ | Object plane | Infinity | 468.0 | | 1900 |
| S1 | Aspherical surface | −290.7 | −76.7 | Mirror | 56.5 |
| S2 | Aspherical surface | −48.33 | −4.0 | T62R | 17.5 |
| S3 | Aspherical surface | −54.37 | −10.1 | | 15.2 |
| S4 | Aspherical surface | 17.58 | −3.0 | T62R | 15.2 |
| S5 | Aspherical surface | −125.2 | −1.0 | | 15.2 |
| S6 | Standard | −29.24 | −5.5 | H-K9L | 15.0 |
| S7 | Standard | −1027.7 | −2.705 | | 15.0 |
| S8 | Standard | 23.94 | −4.2 | H-ZF12 | 15.0 |
| S9 | Standard | −189.4 | −6 | | 14.5 |
| S10 | Standard | −141 | −5.2 | H-LAK52 | 14.0 |
| S11 | Standard | 40.8 | −2.1 | | 14.0 |
| S12 | Aspherical surface | 116.6 | −3 | T62R | 12.5 |
| S13 | Aspherical surface | Infinity | −21.54 | | 12.0 |
| S14 | Diaphragm | Infinity | −2.9 | | 5.3 |

TABLE 1-continued

Parameters of the Ultra-short Focus Projecting optical system 100

| Surface number | Type | Radius R | Thickness | Optical material | Calibre |
|---|---|---|---|---|---|
| | 23 | | | | |
| S15 | Standard | 171.9 | −2.37 | HLAK7A | 5.5 |
| S16 | Standard | 34.33 | −0.42 | | 5.5 |
| S17 | Aspherical surface | 20.5 | −3.5 | DZF10 | 6.0 |
| S18 | Aspherical surface | 23.57 | −0.22 | | 6.0 |
| S19 | Standard | 19.215 | −1.4 | TAFD55 | 8.0 |
| S20 | Standard | −19.15 | −4.5 | HK9L | 8.0 |
| S21 | Standard | 26.94 | −2.4 | | 8.0 |
| S22 | Standard | −125.18 | 5.2 | HQK3L | 10.0 |
| S23 | Standard | 39.3 | −0.21 | | 10.0 |
| S24 | Standard | −298.8 | −4.8 | HQK3L | 10.3 |
| S25 | Standard | 25.94 | −7 | | 10.3 |
| S26 | Standard | Infinity | −21 | HLAK7A | 9.0 |
| S27 | Standard | Infinity | −0.303 | | 6.25 |
| IMA | Image plane | Infinity | | | 6.25 |

Among them, OBJ is the object plane, IMA is the image plane, S26 is a light exit surface of the equivalent prism 12, S27 is a light entry surface of the equivalent prism 12, and S1-S25 are surfaces of the lenses which can refer to FIG. 3.

In addition, coefficients of S1 are:
k: −768;
a1: 0;
a2: 0.00011485935;
a3: −5.3053334 e−007;
a4: 2.126744 e−009;
a5: −5.4787393 e−012;
a6: 8.0470803 e−015;
a7: −4.9662071 e−018.
Coefficients of S2 are:
k: −565.9319;
a1: 0;
a2: −4.6842153 e−006;
a3: 1.3583932 e−008;
a4: 2.96366079486753e−012;
a5: 2.35668648024052 e−015;
a6: −1.7709563837241e−019;
a7: −6.05918030192083 e−022.
Coefficients of S3 are:
k: −565.9319;
a1: 0;
a2: −4.6842153 e−006;
a3: 1.3583932 e−008;
a4: 2.96366079486753e−012;
a5: 2.35668648024052 e−015;
a6: −1.7709563837241e−019;
a7: −6.05918030192083 e−022.
Coefficients of S4 are:
k: −0.4040741;
a1: 0;
a2: 4.90490480030574e−007;
a3: −2.05760498407608e−010;
a4: 2.99679825125034e−014;
a5: 5.55711304020551e−018;
a6: −2.86845642405709e−021;
a7: 2.91053534222281e−025.
Coefficients of S5 are:
k: 90.3686;
a1: 0;
a2: 3.37355419190151e−008;
a3: −1.68426620586378e−010;
a4: −1.77578855135222e−011;
a5: 1.31858269908392e−013;
a6: 1.61679421023673e−016;
a7: −3.13849187032395e−018.
Coefficients of S12 are:
k: −1.3840751;
a1: 0;
a2: −2.79361010729748e−008;
a3: −6.6497057344366e−010;
a4: −2.54430577284334e−013;
a5: −1.8466483140541e−015;
a6: 6.46082131490784 e−017;
a7: −1.54392143969012e−019.
Coefficients of S13 are:
k: −25.2567;
a1: 0;
a2: 4.90490480030574e−007;
a3: −3.94843412007971e−010;
a4: 3.02112629843759e−013;
a5: 1.40840432176276e−015;
a6: 6.90569325719901e−019;
a7: −6.52550386131808 e−021.
Coefficients of S18 are:
k: −12.457;
a1: 0;
a2: 4.904900574 e−007;
a3: −2.05760908 e−010;
a4: 2.99679824 e−014;
a5: −7.4255518 e−16;
a6: 1.3859057 e−18;
a7: 1.8118184 e−23.
Coefficients of S19 are:
k: −1.4040741;
a1: 0;
a2: −5.2362612 e−06;
a3: −2.057608 e−010;
a4: 2.9244063 e−09;
a5: 5.5046807 e−16;
a6: 5.5046807 e−16;
a7: 4.8296771 e−18.

By adopting three plastic aspherical lenses (the third lens 31, the fourth lens 41 and the fifth lens 42), the projection ratio is less than 0.20 and the aperture is 1.8, and high resolution and high brightness are both obtained while low cost is ensured. By reasonably assigning the focus powers of the lenses, the ultra-short focus projecting optical system 100 can balance the defocus amount of each lens at high temperature when three plastic aspherical lenses are adopted, thereby realizing that defocusing does not exist at high temperature. Through reasonable layout of lenses, the second lens group 3 and the third lens group 4 can correct the field curvature and distortion under different projection sizes, so that the projected picture can maintain high resolution between 70 inches and 120 inches.

Figure 4:
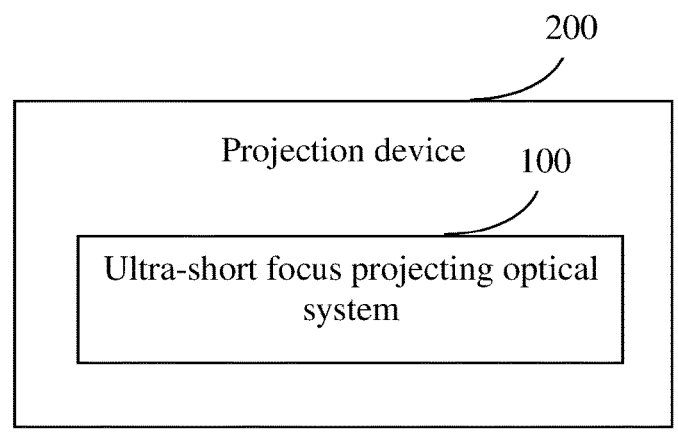
FIG. 4 is a schematic diagram of an embodiment of a projection device provided by the present application.

Referring to FIG. 4, this application also provides a projection device 200, which includes the ultra-short focus projecting optical system 100. The projection device 200 includes all the technical features of the ultra-short focus projecting optical system 100, therefore, the projection device 200 also has the technical effects brought by all the technical features, which will not be described here The above is only an alternative embodiment of the present application and is not to limit the scope of the present application. Any equivalent structural transformation made by using the contents of the present specification and drawings, or any direct/indirect application in other related technical fields, under the inventive concept of the present application, is included in the scope of the present application.

What is claimed is:

1. An ultra-short focus projecting optical system comprising a display unit, a first lens group having a positive optical power, a second lens group having a positive optical power, a third lens group having a negative optical power, and an aspherical reflector arranged in order along a projection direction;
wherein the first lens group comprises a first lens, a second lens and a diaphragm arranged in order along the projection direction, the first lens is a glass aspherical lens, the second lens is a glass spherical lens, and the first lens and the second lens are bent toward the diaphragm from their respective centers to their respective peripheries, the first lens group further comprises a cemented lens located on a side of the first lens away from the second lens, and the cemented lens comprises a sixth lens and a seventh lens cemented together.

2. The ultra-short focus projecting optical system of claim 1, wherein both the second lens group and the third lens group are movable to be close to or away from the display unit in the projection direction.

3. The ultra-short focus projecting optical system of claim 2, further comprising a linkage member connecting the second lens group and the third lens group.

4. The ultra-short focus projecting optical system of claim 3, wherein the second lens group comprises a third lens which is a plastic aspherical lens.

5. The ultra-short focus projecting optical system of claim 1, wherein a focus power of the first lens group is $\varphi_1$, and $0.04 \leq \varphi_1 \leq 0.06$;
a focus power of the second lens group is $\varphi_2$, and $0 \leq \varphi_2 \leq 0.01$;
a focus power of the third lens group is $\varphi_3$, and $-0.04 \leq \varphi_3 \leq 0$; and
a focus power of the aspherical reflector is $\varphi_4$, and $0.06 \leq \varphi_4 \leq 0.09$.

6. The ultra-short focus projecting optical system of claim 1, wherein the third lens group comprises a fourth lens and a fifth lens arranged sequentially along the projection direction, the fourth lens and the fifth lens are plastic aspherical lenses.

7. The ultra-short focus projecting optical system of claim 6, wherein:
a focus power of the fourth lens is greater than or equal to −0.05 and less than or equal to 0; and
a focus power of the fifth lens is greater than or equal to 0 and less than or equal to 0.04.

8. The ultra-short focus projecting optical system of claim 1, wherein:
an optical axis is formed in the ultra-short focus projecting optical system; and
the display unit comprises a digital micro-minor device, an offset between a center of the digital micro-minor device and the optical axis is C, and 2.6 mm≤C≤3 mm.

9. A projection device comprising the ultra-short focus projecting optical system of claim 1.

10. The projection device of claim 9, wherein both the second lens group and the third lens group are movable to be close to or away from the display unit in the projection direction.

11. The projection device of claim 10, wherein the ultra-short focus projecting optical system further comprises a linkage member connecting the second lens group and the third lens group.

12. The projection device of claim 11, wherein the second lens group comprises a third lens which is a plastic aspherical lens.

13. The projection device of claim 9, wherein a focus power of the first lens group is $\varphi_1$, and $0.04 \leq \varphi_1 \leq 0.06$;
a focus power of the second lens group is $\varphi_2$, and $0 \leq \varphi_2 \leq 0.01$;
a focus power of the third lens group is $\varphi_3$, and $-0.04 \leq \varphi_3 \leq 0$; and
a focus power of the aspherical reflector is $\varphi_4$, and $0.06 \leq \varphi_4 \leq 0.09$.

14. The projection device of claim 9, wherein the third lens group comprises a fourth lens and a fifth lens arranged sequentially along the projection direction, the fourth lens and the fifth lens are plastic aspherical lenses.

15. The projection device of claim 14, wherein:
a focus power of the fourth lens is greater than or equal to −0.05 and less than or equal to 0; and
a focus power of the fifth lens is greater than or equal to 0 and less than or equal to 0.04.

16. The projection device of claim 9, wherein:
an optical axis is formed in the ultra-short focus projecting optical system; and
the display unit comprises a digital micro-minor device, an offset between a center of the digital micro-minor device and the optical axis is C, and 2.6 mm≤C≤3 mm.

* * * * *